(12) United States Patent
Heckart et al.

(10) Patent No.: US 12,205,216 B2
(45) Date of Patent: Jan. 21, 2025

(54) SYSTEMS AND METHODS FOR CREATING PERSONALIZED ELECTRONIC ANIMATED SCENES

(71) Applicant: XAPA WORLD, INC., Pleasanton, CA (US)

(72) Inventors: Christine Ann Heckart, Pleasanton, CA (US); Harold Edward Dille, II, Kihei, HI (US); Larry Seidman, Mill Valley, CA (US); Uday Keshavdas, Los Altos, CA (US); Hitesh V. Shah, San Jose, CA (US); Anthony T. Trani, Orinda, CA (US); Demetrio James Cuzzocrea, El Segundo, CA (US); Aaron Baker, Murrieta, CA (US)

(73) Assignee: XAPA WORLD, INC., Pleasanton, CA (US)

( * ) Notice: Subject to any disclaimer, the term of this patent is extended or adjusted under 35 U.S.C. 154(b) by 0 days.

(21) Appl. No.: 17/688,432

(22) Filed: Mar. 7, 2022

(65) Prior Publication Data

US 2023/0281905 A1    Sep. 7, 2023

(51) Int. Cl.
| | | |
|---|---|---|
| *G06T 13/80* | (2011.01) | |
| *G06Q 20/12* | (2012.01) | |
| *G06T 13/20* | (2011.01) | |
| *G06T 15/20* | (2011.01) | |

(52) U.S. Cl.
CPC ........... *G06T 13/80* (2013.01); *G06Q 20/123* (2013.01); *G06T 13/205* (2013.01); *G06T 15/205* (2013.01)

(58) Field of Classification Search
None
See application file for complete search history.

(56) References Cited

U.S. PATENT DOCUMENTS

| | | | |
|---|---|---|---|
| 7,035,803 | B1 | 4/2006 | Ostermann et al. |
| 9,154,456 | B2 | 10/2015 | Molina et al. |
| 10,713,709 | B2 | 7/2020 | Glass et al. |
| 2013/0211970 | A1* | 8/2013 | Glass ................ G06Q 30/0641 705/27.1 |
| 2015/0331550 | A1 | 11/2015 | Wang et al. |
| 2016/0105691 | A1* | 4/2016 | Zucchetta ............ H04N 21/436 725/82 |
| 2016/0371668 | A1* | 12/2016 | Priebatsch ........... G06Q 20/348 |

(Continued)

OTHER PUBLICATIONS

Jibjab, eCards—Customize & Send Funny Greeting Cards Online, https://www.jibjab.com/, accessed Nov. 29, 2021, 6 pages.

(Continued)

*Primary Examiner* — Aaron M Richer
(74) *Attorney, Agent, or Firm* — Standley Law Group LLP; Jeffrey S. Standley; Adam J. Smith

(57) ABSTRACT

Systems and methods for permitting large scale user defined communications comprising animated scenes rendered in real-time are provided. Indications are received from sending ones of user devices regarding desire to create the user defined communications. User selections are received from templates generated at the sending user devices. Particular content items are retrieved from content databases in accordance with the user selections. Metadata is transmitted to receiving user devices that is sufficient to, when selected, cause generation of a custom animated scene with the particular content items in real-time at a viewing user device.

3 Claims, 7 Drawing Sheets

(56) References Cited

U.S. PATENT DOCUMENTS

| | | | | |
|---|---|---|---|---|
| 2017/0352187 | A1* | 12/2017 | Haines | G06V 20/20 |
| 2018/0101976 | A1* | 4/2018 | Lewis | G09G 5/34 |
| 2018/0188916 | A1* | 7/2018 | Lyons | G06F 3/0482 |
| 2019/0073817 | A1* | 3/2019 | Sung | G06F 3/167 |
| 2019/0371038 | A1* | 12/2019 | Filkov | G06F 3/04842 |
| 2020/0074447 | A1* | 3/2020 | Isaacson | G06Q 20/10 |
| 2021/0006974 | A1* | 1/2021 | Stanek | H04L 51/10 |
| 2022/0044461 | A1* | 2/2022 | Lomax | G06F 40/40 |
| 2023/0171220 | A1* | 6/2023 | Khosrowshahi | H04L 51/48 |
| | | | | 715/752 |

OTHER PUBLICATIONS

Blue Mountain, Ecards—Send Free Online Greetings, https://www.bluemountain.com/ecards, accessed Nov. 29, 2021, 6 pages.

Smilebox, Free Animated eCards | Choose from 100s of Templates | Smilebox, https://www.smilebox.com/maker/card-maker/animated, accessed Nov. 29, 2021, 6 pages.

American Greetings, Personalized Ecards | Try SmashUps Free | American Greetings, https://www.americangreetings.com/cards/ecards/smashups/, accessed Nov. 29, 2021, 14 pages.

* cited by examiner

— 120

Sender interests:
☐ Golf
☐ Football
☐ Hiking
☐ Fishing
☐ Reading
☐ Poetry

Recipient interests:
☐ Golf
☐ Football
☐ Hiking
☐ Fishing
☐ Reading
☐ Poetry

Figure 6

SYSTEMS AND METHODS FOR CREATING PERSONALIZED ELECTRONIC ANIMATED SCENES

CROSS-REFERENCE TO RELATED APPLICATIONS

This application is a non-provisional patent application and makes no priority claim.

TECHNICAL FIELD

Exemplary embodiments relate generally to systems and methods for creating personalized electronic animated scenes, such as by rendering the animated scenes in real-time.

BACKGROUND AND SUMMARY OF THE INVENTION

Electronic messaging has become an increasingly common form of communication between individuals. Various electronic messaging forms are known, including emails and text messages. Only certain types of content may generally be included in such messages, which limits an individual's ability to express themselves and thereby convey their message in its fullest extent. Animations provide for increased creativity of expression, but such animations must be created in advance, which is a difficult and time-consuming endeavor. This makes personalization of such animations at scale impractical for technically skilled animators, and impossible for unskilled individuals, particularly in a manner which permits a user to reach a large number of different individuals segmented into multiple groups.

Systems and methods for creating personalized electronic animated scenes, such as which render the animated scenes in real-time, are provided. A server placed in electronic communication with a number of user devices may receive data from one of the user devices indicating a sender's desire to send an animated scene. Data for a template may be transmitted electronically from the server to the sender's device. The template may be generated based on the preferences of the sender as well as the distinct preferences of each intended recipient of the animated scene in exemplary embodiments. If the recipient is a registered user, at least some of the preferences may be based on selections made by the recipient during or after registration. If the recipient is not a registered user, at least some of the preferences may be based on selections made by the sender based on their knowledge of the recipient during an animated scene definition process. Alternatively, the template may be generated based on preferences of the sender only.

Selections made at the template may be transmitted electronically from the first device to the server. The selections may include, for example without limitation, music, speech, sound effects, particle effects, characters, avatars, digital accessories (e.g., virtual clothing, jewelry, tattoos, combinations thereof, or the like), text, animations, photos, images, videos, gifts, personal information, colors, font, text size, back drops/environments, lifecycle, combinations thereof, or the like. Senders may also send gifts, either digital assets or gift cards redeemable for physical goods, to some or all of the recipient of an animated scene. These selections may be used to define the animated scene to be created as part of a message from the sender to the recipient. The animated scene may be wholly or partially customized, such as in accordance with the selections made at the template.

A notification may be transmitted to the second device for the recipient regarding the message created by the sender and intended for the recipient. If the recipient is a registered user, the notification may comprise metadata. If the recipient is not a registered user, the notification may comprise a hyperlink. Regardless, upon selection, the server may be notified and the animated scene defined by the sender may be rendered in real-time in accordance with the selections made by the sender, such as during the animated scene definition process. The animated scene may be viewable at the second device, such as so long as the lifecycle has not expired. In exemplary embodiments, without limitation, animated scene is viewable at an application installed at the second device and/or cloud hosted which is capable of rendering animated scene in real time at the second device. Alternatively, or additionally, the animated scene may be viewable at the second device by way of a centrally hosted streaming format or for other playback.

The animated scenes, or related messages, may include gifts. Gifts may include, but are not necessarily limited to, money, digital currencies, coupons, gift cards, services, representations of physical goods to be delivered, combinations thereof or the like. The animated scene may include a notification of the nature of the gift and a reason for gifting, in exemplary embodiments. The notification may comprise a representation of the gift in physical form (e.g., an object sent, currency, a gift card, or the like).

Certain of the animated scenes may be created by outside parties or comprise certain pre-defined criteria. For example, without limitation, sponsored or premium animated scenes may be provided or purchased which comprise certain predefined elements or selections (e.g., avatars, images, videos, icons, music, sounds). Such sponsored or premium animated scenes may be automatically assigned a limited lifecycle and/or reproduction permissions.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 6 is a plan view of an exemplary preference selection interface provided by the system of FIG. 1.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
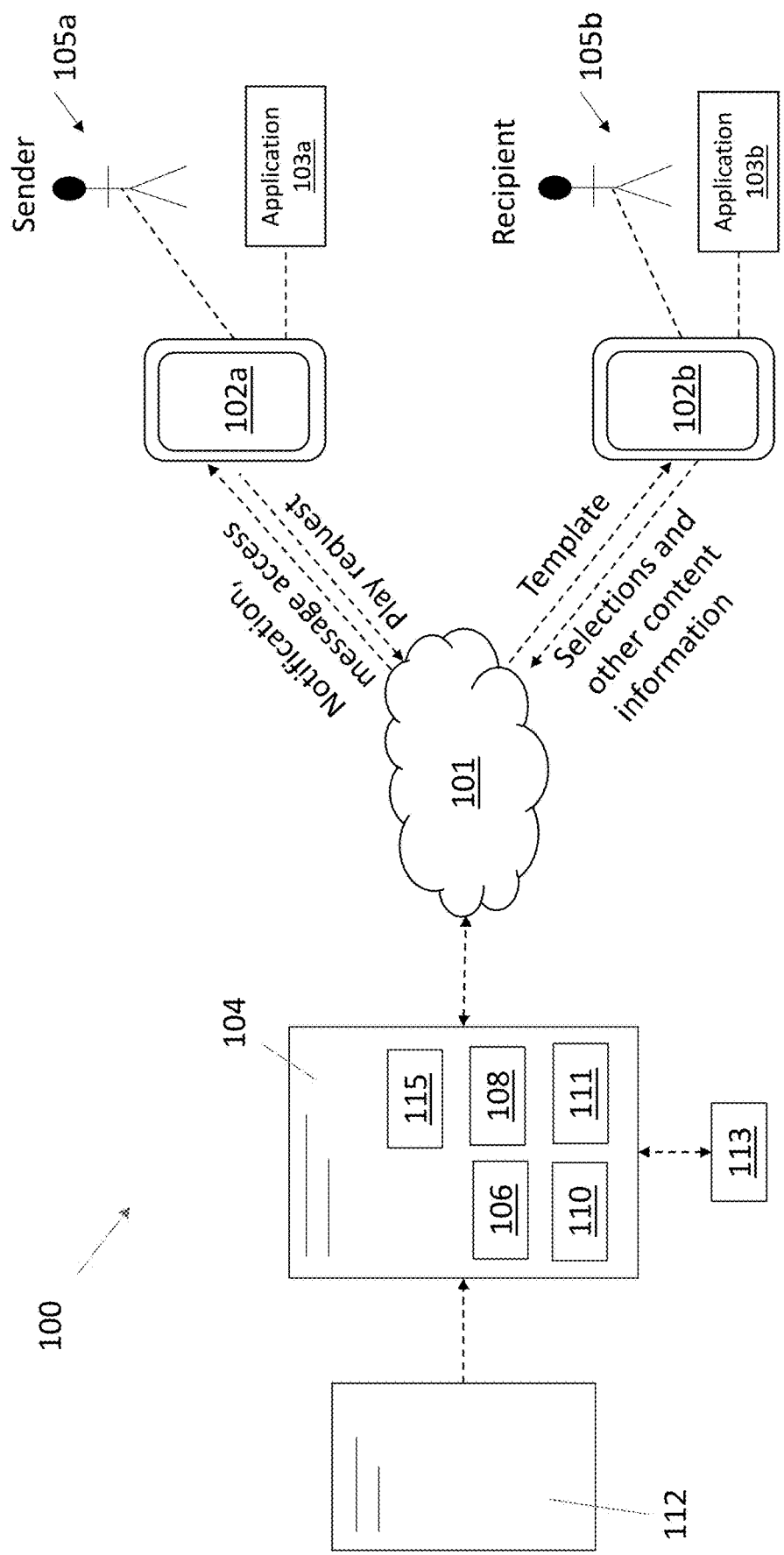
FIG. 1 is a simplified system diagram for creating personalized electronic animated scenes for others to view.

FIG. 1 illustrates a system 100 for generating animated scenes 118. The system 100 may comprise one or more servers 104. The system 100 may comprise one or more user devices 102 in electronic communication with the server(s) 104. The user devices 102 may comprise smartphones, personal computers (e.g., desktop computers, laptops, or the like), tablets, smartwatches, wearable electronic devices, virtual reality device, combinations thereof, or the like. Each of the devices 102 may be associated with a user 105. For example, without limitation, a first one of the user devices 102a may be associated with a sender 105a. A second one of the user devices 102b may be associated with a recipient 105b. This is merely exemplary and is not intended to be limiting. Any number of user devices 102 may be utilized, each of which may be associated with one or more users 105. For example, multiple ones of the user devices 102 may each be associated with one of multiple sender users 105 and multiple ones of the user devices 102 may be associated with recipient users 105. Furthermore, a same one of the user devices 102 may operate as a sender some of the time and a recipient 105b at other times. Notably, any of the user devices 102 may be configured for electronic communication, direct or indirect, to a single or multiple other ones of the user devices 102.

Some or all of the user devices 102 may have one or more applications 103 or other software routines installed thereon to support the functionality shown and/or described herein, though such is not required. Alternatively, or additionally, some or all of the user devices 102 may comprise internet connectivity software or applications 103 which support the functionality shown and/or described herein, though such is not required. For example, the first device 102a may have a first copy 103a of the application installed thereon, the second device 102b may have a second copy 103b of the application installed thereon, and so forth. As another example, without limitation, some or all of the user devices 102 may have internet browsers installed thereon. The sender 105a may be an individual, such as a third-party individual user of the application 103, a representative of a third-party entity, or may be a representative of an entity who owns and/or operate the application 103.

The server(s) 104 may be in electronic communication with one or more databases and/or other central storage devices 112 (hereinafter referred to as generally as a "database(s) 112" or the like). The database(s) 112 may comprise content data and/or template data. The content data may comprise, for example without limitation, music, characters, avatars, text, animations, shapes, objects, code, software routines, colors, font, text size, back drops, lifecycle data, combinations thereof, or the like.

Electronic communication between the various components of the system 100, such as but not limited to, the user device 102, the server(s) 104, the database(s) 112, and the like may be accomplished by way of one or more networks 101. The network(s) 101 may comprise wired and/or wireless networks, such as but not limited to, internets, intranets, the world wide web, cellular networks, combinations thereof, or the like.

In exemplary embodiments, multiple servers 104 are connected to one or more content delivery networks (CDNs), such as to reach a number of different user devices 102 which may be geographically disbursed and/or of various type. The network(s) 101 may comprise the CDN(s).

The server(s) 104 may comprise, or be in electronic communication with, a gifting module 113. The gifting module 113 may be configured to permit the electronic inclusion of one or more gifts with the animated scenes 118 and/or related messages. The gifting module 113 may comprise, or be in electronic communication with, one or more electronic banking systems, credit card processors, payment processors, gift card vendors, digital currency providers or exchanges, retailer systems, link generation subsystems, code generation systems, combinations thereof, or the like. The gifting module 113 may be configured to receive user selections regarding gifts to be included with animated scenes 118. The gifts may include, for example without limitation, money, digital currencies, coupons, gift cards, services, representations of physical goods to be delivered, links to retailer sites (e.g., for goods or services ordered, to generate coupons or gift cards, etc.) combinations thereof or the like. The gifting module 113 may be configured to accept and/or process payment information for the gifts. The gifting module 113 may be configured to electronically order purchased gifts on the sender's behalf. Where gifts are included, the animated scene 118 may include a notification of the nature of the gift and a reason for gifting, in exemplary embodiments. The notification may comprise one or more textual descriptions of the gift, electronic representations of the gift (e.g., photo of product, image of currency, or the like), links or codes to redeem the gift, combinations thereof, or the like, which are generated by the gifting module 113 in exemplary embodiments.

Figure 2:
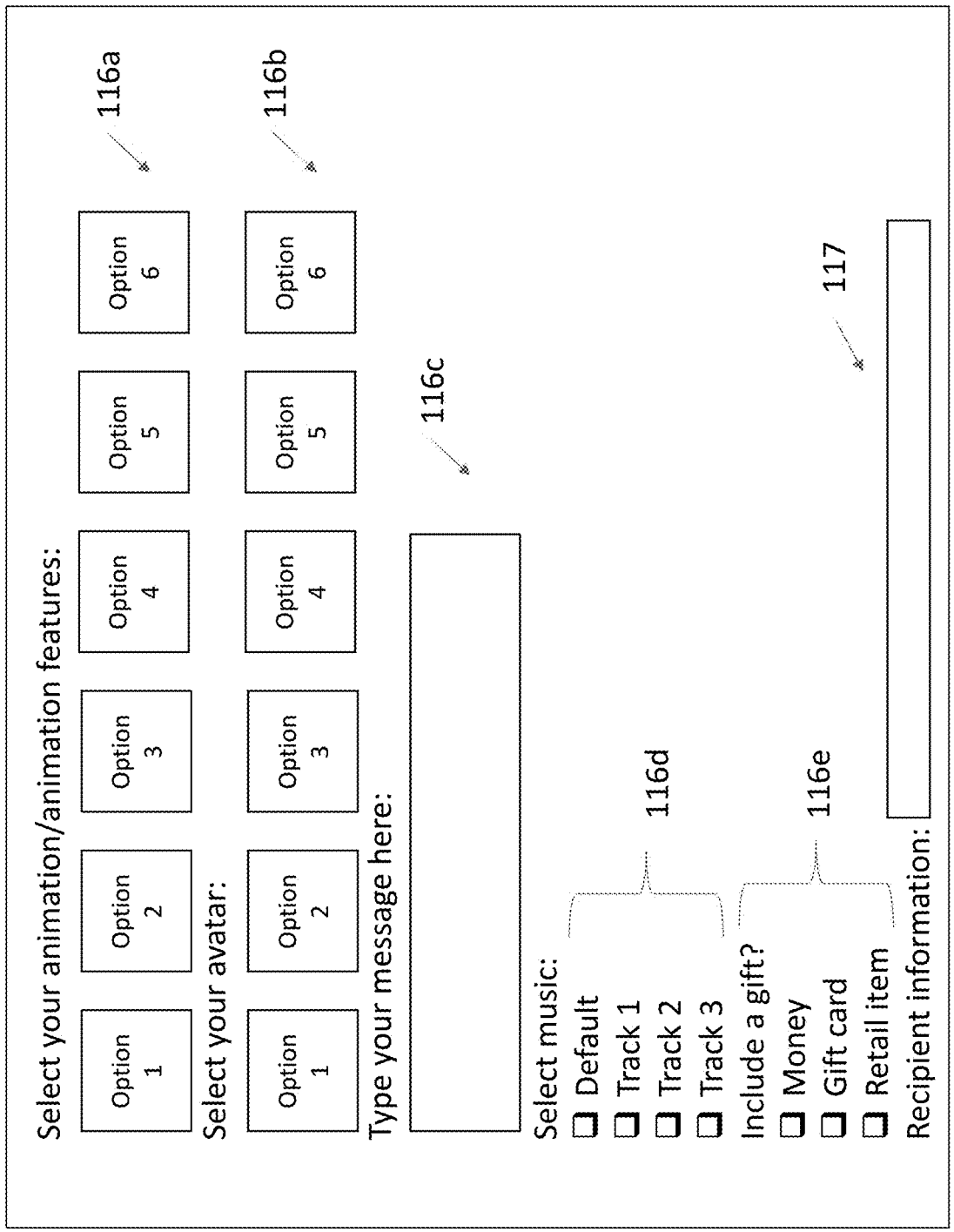
FIG. 2 is a an exemplary template provided by the system of FIG. 1.

The template data may comprise data sufficient to generate a template 114, such as illustrated in FIG. 2 by way of non-limiting example, at one or more of the user devices 102, such as the first user device 102a. The template 114 may comprise a number of options 116 for selecting or providing certain of the content data for use in defining one of the animated scenes 118 for generation by the system 100. By way of non-limiting example, the options 116 may include an animation option 116a, an avatar option 116b, a text content option 116c, a music option 116d, and/or a gifting option 116e. Any number and type of options 116 may be provided. For example, without limitation, options 116 may be provided for uploading or selecting pictures, images, videos, music, combinations thereof, or the like.

The template 114 may comprise a field 117 for entering recipient information, such as but not limited to one or more emails, phone numbers, social media handles, combinations thereof, or the like.

The server(s) 104 may comprise a number of subsystems. The subsystems may comprise, by way of non-limiting example, a real-time animation subsystem 106, an avatar subsystem 108, and/or a animation player subsystem 110. The functions of each of which are described in greater detail herein.

Figure 3:
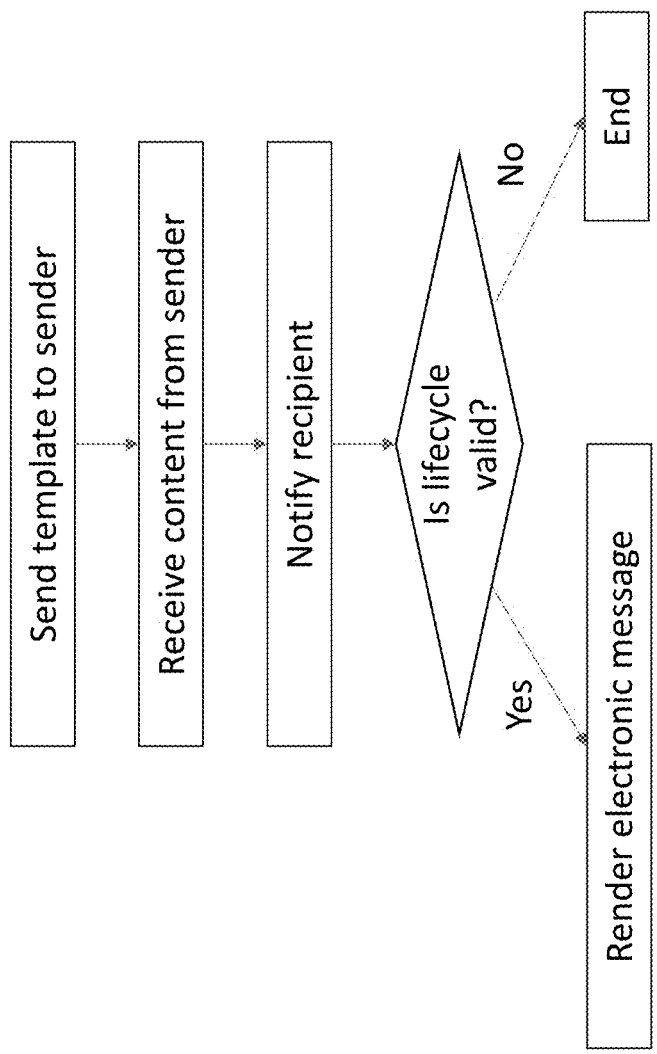
FIG. 3 is a flow chat with exemplary logic for operating the system of FIG. 1.
Figure 4C:
FIGS. 4a-4f are screen captures of an exemplary animated scene generated by the system of FIG. 1.
Figure 4B:
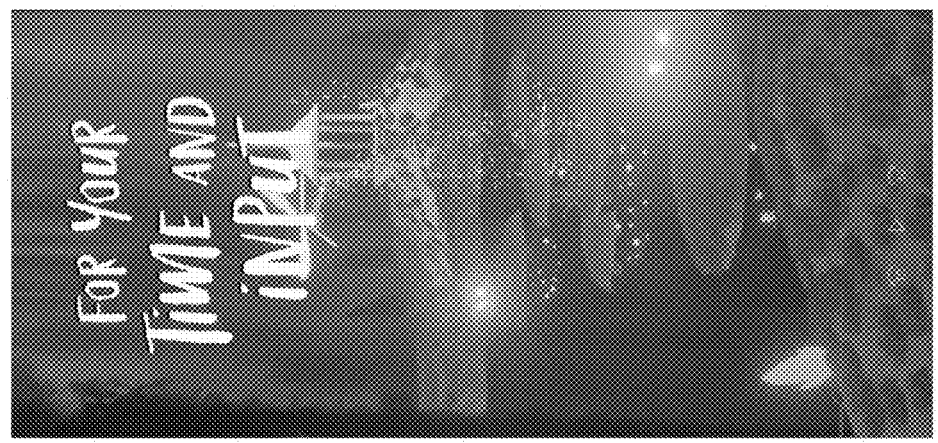
Figure 4A:
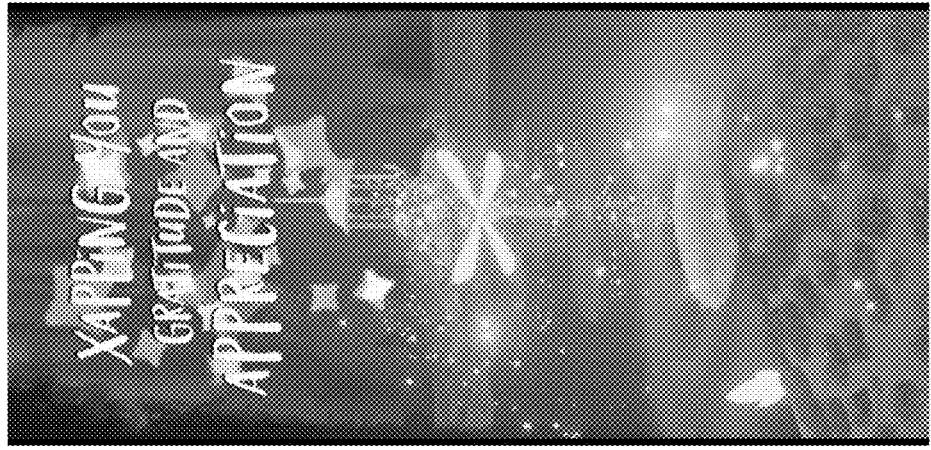
Figure 4F:
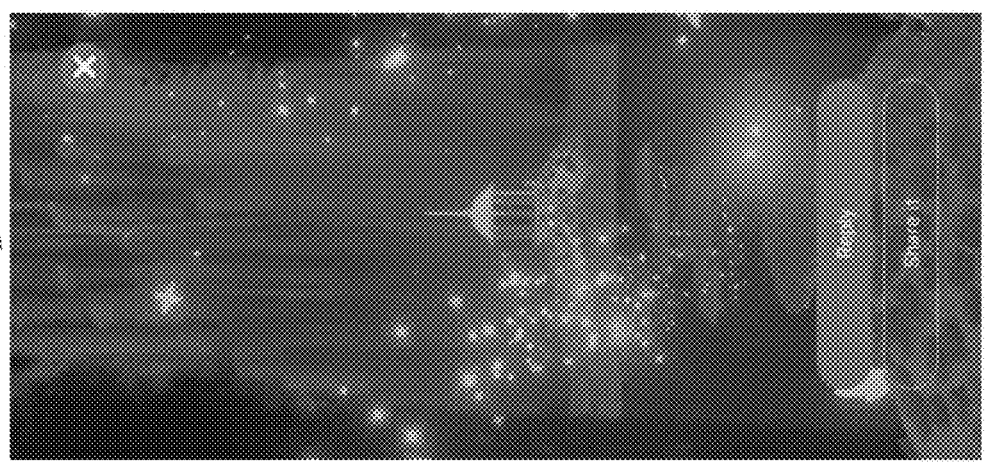
Figure 4E:
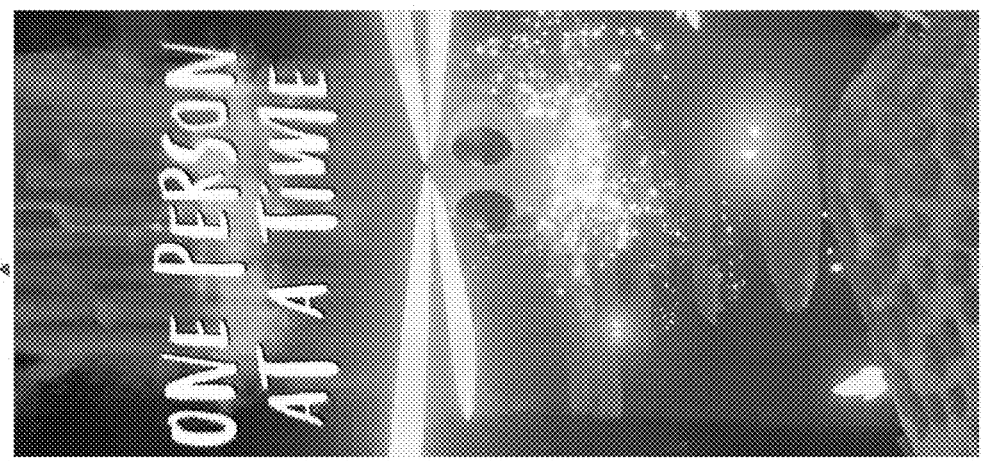
Figure 4D:
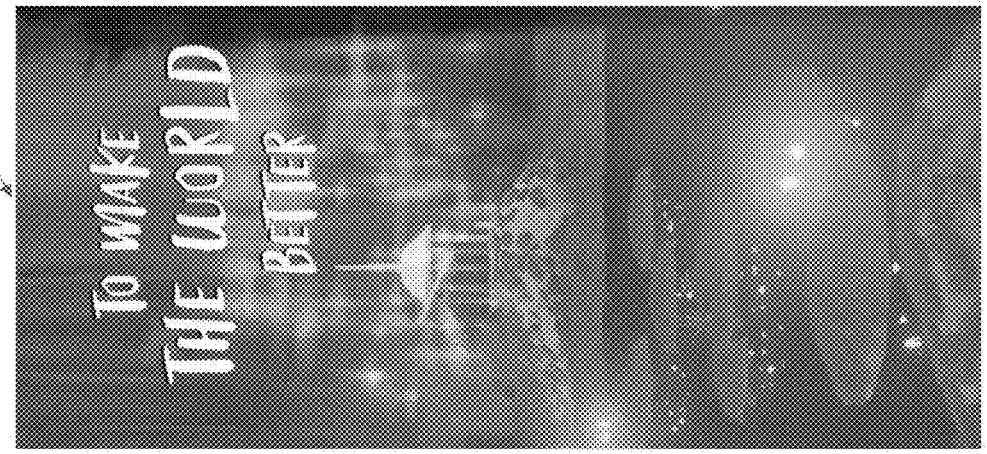

As shown with particular regard to at least FIG. 3, data may be received at the server(s) 104 from the first user device 102a indicating a desire for the sender 105a to define an animated scene 118 for sending. The server(s) 104 may be configured to electronically transmit template data to the first device 102a for generating the template 114 at the first user device 102a. The sender 105a may select options 116 at the template 114 and/or provide other content (e.g., typed words, phrases, characters, a brief message, etc.) for use in the animated scene 118. The user selections and/or other content may be provided by the first device 102a to the server(s) 104. User selections may be made by way of touch input, clicking at a device (e.g., mouse), typing (e.g., keyboard), voice control, gesture control, or other human-interface devices. The user selections and/or other content may be provided as part of an animated scene definition process for defining the animated scene 118 to ultimately be rendered by the system 100 for the recipient 102b. Selections made at the gifting option 116e, in exemplary embodiments without limitation, may be configured to control gifts provided at the gifting module 113.

In exemplary embodiments, the template 114 or other screen may prompt the sender 102a to enter identifying information for the recipient 102b, such as at the field 117. Such information may include, for example without limitation, a user name, a name, an email address, a phone number, an IP address, recent recipients, social media handle, combinations thereof, or the like. Multiple recipients for a given animated scene 118 may be identified.

The server(s) 104 may generate and electronically transmit a notification to the second device 102b regarding the availability of the animated scene 118 for viewing. If the recipient 105b is a registered user, the notification may comprise metadata. For example, without limitation, the notification may be generated by the first device 102b, such as part of the application 103b installed at the second device 102b. If the recipient 105b is not a registered user, the notification may comprise a hyperlink. For example, the notification may be provided by way of text message, email, social media post, electronic notification, near filed communication transfer, combinations thereof, or the like sent to the second device 102b. Where multiple recipients 102b are identified, multiple such notifications may be generated for the same animated scene 118.

In exemplary embodiments, the animated scene 118 may not be actually generated unless and until data is received at the server(s) 104 from the second device 102b indicating desire of the user 105 to view the animated scene 118. Upon receipt of such an indication, the server(s) 104 may generate the animated scene 118 in accordance with the user selections and/or other content provided as part of the animated scene definition process. The animated scene 118 may be generated by retrieving content data from the database(s) 112 in accordance with the user selections, rendering the animated scene using the real-time animation subsystem 106 and/or avatar subsystem 108. Where multiple recipients 102b are identified, multiple such generations of the animated scene 118 may be completed on an individualized basis for each of the recipients 102b.

The real-time animation subsystem 106 may comprise, or be in electronic communication with, one or more three-dimensional animation engines, such as but not limited to, those available from UNITY™ available from Unity Software Inc. of San Francisco, CA (https://unity.com/). The engine(s) may be local to the server(s) 104 or remote therefrom.

Where selected as part of the animated scene definition process, the animated scene 118 may comprise one or more avatars for the sender 105a. The avatar subsystem 108 may be configured to render a user selected avatar in a manner visually correspondent with a selected written message such that the rendered avatar appears to speak the written message selected or otherwise provided by the sender 105a. The avatar subsystem 108 may, alternatively or additionally, be configured to utilize an audio recording provided by the user of a spoken message and render the avatar to appear to speak, sing, or the like in synchronization with the audio recording provided. Such avatar portions of the animated scene 118 may be rendered by the avatar subsystem 108, such as but not limited to, by use of one or more three-dimensional animation engines, such as but not limited to, those available from UNITY™ available from Unity Software Inc. of San Francisco, CA (https://unity.com/). The same or different engine(s) may be used for the real-time animation subsystem 106 and/or avatar subsystem 108. In exemplary embodiments, the avatar may appear as part of the animated scene 118. Some or all animated scenes 118 may comprise a default avatar, multiple avatars of same of different type, or no avatar. The engine(s) may be local to the server(s) 104 or remote therefrom.

The three-dimensional animation engine(s) may be configured to generate a high-quality animated scene 118, such as in real-time or substantially real-time. Real-time and/or substantial real-time may account for routine delays in transmission, processing, or the like. In this manner, a high-quality animated scene 118 may be consistently generated on a personalized basis such that animated scenes 118 may be widely generated and distributed. This may also permit the animated scene 118 to only be generated when needed, thereby minimizing impact on electronic resources.

The server(s) 104 may comprise one or more server control layers for interfacing with the three-dimensional animation engine(s). This may, for example without limitation, permit translation of the user selections and/or other content provided from the template 114 or otherwise as part of the animated scene definition process to be used in rendering the animated scenes 118.

In exemplary embodiments, without limitation, the system 100 may be configured to initially check if the animated scene 118 is still within a valid lifecycle. The lifecycle may be selected by the sender 105a, such as part of the animated scene definition process, and/or by default settings. The lifecycle may be set for a number of views (e.g., 1 view, 10 views, unlimited views, etc.), a time period (e.g., seconds, days, months, indefinite, etc.), combinations thereof, or the like. The system 100 may be configured to render the animated scene 118, such as on an on-demand basis, while the lifecycle is valid. If the lifecycle is expired, the system 100 may be configured to no longer render the animated scene 118. The lifecycle may be determined automatically, by the sender 105a, the recipient 105b, an operating entity for the server(s) 104 combinations thereof, or the like. For example, without limitation, the lifecycle may be one of the options 116 selected at the template 114.

Certain animated scenes 118 may be comprise elements created and/or owned by an operating entity for the server(s) 104, third parties, or the like, such as for sponsored or premium animated scenes 118, by way of non-limiting example. Such sponsored or premium animated scenes 118, in exemplary embodiments without limitation, may include one or more pre-defined elements including, but not necessarily limited to, artistic works, names, logos, likenesses, combinations thereof, or the like. Such predefined elements may be provided as animations, avatars, photos, videos, music, texts, combinations thereof, or the like within the sponsored or premium animated scenes 118, by way of non-limiting example. The server(s) 104 may be configured to restrict reproduction of such animated scenes 118 or elements thereof, such as by automatically requiring payment for distribution, restricting download, restricting lifecycle, restricting editing, restricting access permissions, combinations thereof, or the like in exemplary embodiments, without limitation. Rights, permission, and/or replay or reproduction options (e.g., sharing) may be predefined and/or provided as options 116 at the template 114.

The animated scenes 118 may comprise, or be associated with, one or more non-fungible tokens ("NFTs"). NFTs may be used with sponsored, premium, or otherwise right restricted animated scenes 118 in exemplary embodiments, such as for identification and tracking purposes.

The animated scene 118, in exemplary embodiments, may be made available by way of the animation player subsystem 110. The animation player subsystem 110 may facilitate streaming view at the second device 102b, or multiple devices 102 where multiple recipients are identified, and/or a portal for viewing the animated scene 118 (e.g., through application, website, etc.). In this manner, the animated scene 118 may not be normally downloadable in a permanent fashion, so as to minimize use of electronic storage resources, though such is not required. In such embodiments, the animated scenes 118 may be centrally hosted at the server(s) 104, by way of non-limiting example, and may be viewable in a streaming format. In other exemplary embodiments, without limitation, the server(s) 104 may be configured to permit download of the animated scenes 118, or certain ones of the animated scenes 118, such as based on user or operating entity preferences or requirements. Downloadable or non-downloadable (e.g., streaming) format may be predetermined and/or provided as one of the options 116 at the template 114.

FIG. 4a through FIG. 4f illustrate various exemplary screen captures from an exemplary animated scene 118 rendered by the system 100. The animated scene 118 may be rendered in the form of a short video, such as with multiple images, one or more avatars, one or more characters, one or more words, musical accompaniments, backdrops, audio tracks, photos, videos, gifts, combinations thereof, or the like. Such items may be user uploaded or selected from a library of available options. The animated scenes 118 may be from 1-60 seconds in duration, in exemplary embodiments without limitation. The animated scenes 118 may be of any duration. The animated scene 118 may comprise options for closing, replying to the sender 105a, and/or sharing with others by way of non-limiting example. Sharing may permit options for forwarding the animated scene 118, posting to social media, combinations thereof, or the like. Replying may include generating a responsive one of the animated scenes 118 with the system 100, email, text message, phone call, audio message, video message, combinations thereof, or the like.

The server(s) 104 may comprise a survey module 115. The survey module 115 may be configured to generate and transmit an electronic survey to some or all of the sending one(s) of the user devices 102a and/or each receiving one(s) of the user devices 102b in exemplary embodiments. The electronic survey may request user input regarding user experience with the animated scene 118, including but not limited to, ease of creation, ease of viewing, enjoyment in interaction, combinations thereof, or the like. Such feedback may be gathered in the form of written text, numerical scale rating, combinations thereof, or the like. The server(s) 104 may be configured to store and provide summarized views of such feedback, such as on an on-demand basis to administrative credentialed users.

Figure 5:
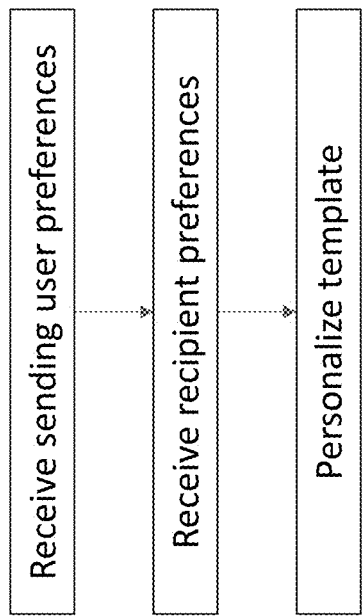
FIG. 5 is a flow chart with other exemplary logic for operating the system of FIG. 1.

As illustrated with particular regard to FIG. 5, the template 114 may be personalized based on preferences of the sender 105a and/or the recipient 105b. In exemplary embodiments, when setting up a registered user profile with the system 100, such as on an application 103 or through a website, user selection of various interests may be made. FIG. 6 provides an exemplary preference selection interface 120 which may be provided by the system 100 at the user devices 102 for making such interest selections. The sender 105a may be prompted to, and/or may actually select, only their own interest, or those of themselves and the recipient(s) 105b. A recipient 105b may be prompted to, and/or may actually select, only their own interests. In this manner, if both the sender 105a and the recipient 105b are registered users, their interests may already be recorded with the system 100. Such sections may be stored at the database(s) 112 in exemplary embodiments.

The personalization subsystem 111 may be configured to tailor the template 114 and/or animated scene 118 in accordance with the preferences, such as but not limited to, only providing options 116 corresponding to, electronically associated with, or otherwise relevant to the selected interests of one or both of the sender 105a and/or recipient 105b. This may provide for more efficient and/or personalized animated scene 118 creation. The content data at the database(s) 112 may be associated with certain interests. For example, various musical accompaniments may be provided based on a user's music interests, various characters, messages, or animation subjects may be suggested based on user's interest, combinations hereof, or the like.

The template 114, preference selection interface 120, and/or other screens or interfaces may be preloaded, such as part of the applications 103, and/or delivered to the user device(s) 102 in hyper-text mark-up language (HTML) or other format(s), such as to the application(s) 103 and/or a web browser installed at the user device(s) 102. Portions or all of the template 114, preference selection interface 120, and/or other screens or interfaces may be preloaded on the user device(s) 102, such as by way of the installed application(s) 103. Various signals may be relayed herein, such as but not limited to between the server(s) 104 and the user device(s) 102, using hypertext transfer protocol (HTTP) by way of non-limiting example.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphone, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A system for permitting large scale user defined communications comprising animated scenes rendered in real-time, said system comprising:
    user devices, comprising sending user devices and recipient user devices;
    one or more content databases comprising content items for animated scenes, said content items comprising: avatars, images, sounds, and text, and a plurality of sponsored or premium ones of said animated scenes, each comprising a pre-selected of one or more of the content items which are accessible only with the sponsored or premium ones of said animated scenes;
    one or more servers comprising software instructions, which when executed, configure one or more processors to:
        receive user preferences from certain of said user devices, including said a first one of said sending user devices and a first one of said recipient user devices, regarding a recipient user;
        receive indication from said first one of said sending user devices regarding desire to create one of said user defined communications;
        generate a user selection template at said first one of said sending user devices, wherein said user selection template is personalized based on said user preferences and comprises suggested ones of the content items, including suggested avatars, images, sounds, and text;
        receive user selections made at said user selection template from said first one of said sending user devices, said user selections comprising at least one of each of the suggested avatars, images, sounds, and text, provided at the user selection template and identifying information for a first subset of said recipient user devices;
        retrieve particular ones of the content items from said one or more content databases in accordance with said user selections, said particular ones of content items comprising said avatars, images, sounds, text indicated in said user selections;
        transmit metadata to the first subset of said recipient user devices indicated at said user selections at said user template, wherein said metadata is sufficient to, when selected by a viewing one of said first subset of said recipient user devices, cause said viewing one of said user devices to generate custom one of said animated scenes comprising said particular one of the content items in real-time at said viewing one of said viewing one of said user devices such that said text is overlaid to said images while said avatars are electronically animated and the sound is played such that a distinct, respective selection of the text is overlaid to a distinct, respective subset of the images such that all of the text and all of the images of the custom animated scene are sequentially generated in a non-repeated fashion during display of the custom animated scene, where said text comprises a plurality of multi-letter words, and each of the distinct, respective selection of the text comprises a subset of words of the plurality of multi-letter words;
        automatically assign a lifecycle to said custom animated scene, wherein said lifecycle comprises a defined window of time opening at a time of creating and ending a predetermined length from said time of creation;
        receive a second set of user selections made from a second one of said sending user devices, said second set of user selections comprising a selection of one of said plurality of sponsored or premium ones of said animated scenes and one or more user defined content items comprising one or more of the content items not predefined by the selected one of the plurality of sponsored or premium ones of said animated scenes;
        retrieve a second set of particular ones of the content items from said one or more content databases in accordance with said second set of user selections;
        transmit met a second subset of said receipt user devices indicated at said user selections, wherein said metadata is sufficient to, when selected by a viewing one of said second subset of said recipient user devices, cause said viewing one of said user devices to generate a second custom one of said animated scenes comprising the a second set of particular ones of the content items at said viewing one of said user devices such that said text is overlaid to said images while said avatars are electronically animated and the sound is played such that a distinct, respective selection of the text is overlaid to a distinct, respective subset of the predefined images such that all of the text and all of the images of the second set of particular ones of the content items are sequentially generated during display de second custom one of said animated scenes; and
        automatically rights management criteria to the second custom one of said animated scenes, said rights management criteria including a predetermined, limited lifecycle a restricted reproduction permission for the second custom one of said animated scenes; and
    a real-time three-dimensional animation engine associated with said one or more servers and configured to generate said custom animated scene and permit viewing of said custom animated scene only during the window of time;
    a gifting module, wherein said user selection comprise gifting options, and wherein said gifting module is configured to, where said use elections include selection of at least one of said gifting options, accept payment from said sending user device and cause said animated scene to include electronic notification of said selected one of said gifting options.

2. The system of claim 1 wherein:
the user devices comprise smartphones; and
each of the user devices comprise an installed application hosted by said one or more servers.

3. The system of claim 1, wherein:
said one or more content databases comprise non-fungible tokens ("NFTs"), each of which is associated with one of said plurality of sponsored or premium ones of said animated scenes; and said one or more electronic storage devices comprise additional executable software instructions, which when executed, configure said one or more processors to: attach one of said NFTs to each of said plurality of sponsored or premium ones of said animated scenes.

* * * * *